(12) United States Patent
Zitnick, III et al.

(10) Patent No.: US 7,903,883 B2
(45) Date of Patent: Mar. 8, 2011

(54) LOCAL BI-GRAM MODEL FOR OBJECT RECOGNITION

(75) Inventors: Charles Lawrence Zitnick, III, Seattle, WA (US); Xiangyang Lan, Ithaca, NY (US); Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1011 days.

(21) Appl. No.: 11/694,938

(22) Filed: Mar. 30, 2007

(65) Prior Publication Data

US 2008/0240551 A1 Oct. 2, 2008

(51) Int. Cl.
*G06K 9/00* (2006.01)
(52) U.S. Cl. .................. 382/225; 382/226; 382/228
(58) Field of Classification Search .................. None
See application file for complete search history.

(56) References Cited

U.S. PATENT DOCUMENTS

| | | | |
|---|---|---|---|
| 6,041,133 | A | 3/2000 | Califano |
| 6,118,887 | A * | 9/2000 | Cosatto et al. ............ 382/103 |
| 6,393,143 | B1 | 5/2002 | Pipitone |
| 6,747,643 | B2 | 6/2004 | Happel |
| 6,807,286 | B1 | 10/2004 | Krumm et al. |
| 7,043,084 | B2 | 5/2006 | Beardsley |
| 7,099,510 | B2 | 8/2006 | Jones et al. |
| 2003/0128876 | A1 | 7/2003 | Yamaguchi |
| 2004/0165775 | A1 | 8/2004 | Simon et al. |
| 2005/0213818 | A1 | 9/2005 | Suzuki et al. |
| 2006/0204079 | A1 | 9/2006 | Yamaguchi |
| 2006/0228000 | A1 | 10/2006 | Miyajima et al. |

FOREIGN PATENT DOCUMENTS

WO WO-2006001525 A1 1/2006

OTHER PUBLICATIONS

Brown, M., R. Szeliski, and S. Winder, Multi-image matching using multi-scale oriented patches, Proc. IEEE Conf. on Computer Vision and Pattern Recognition, 2003, pp. 510-517, vol. 1.
Brown, P. F., V. J. Della Pietra, P. V. Desouza, J. C. Lai and R. L. Mercer, Class-based n-gram models of natural language, Computational Linguistics, 1992, pp. 467-479, vol. 18, No. 4.
Carneiro, G. and D. Lowe, Sparse flexible models of local features, Proc of European Conf. on Computer Vision, 2006, pp. 29-43.

(Continued)

*Primary Examiner* — Brian P Werner
(74) *Attorney, Agent, or Firm* — Lyon & Harr, L.L.P.; Craig S. Fischer

(57) ABSTRACT

A local bi-gram model object recognition system and method for constructing a local bi-gram model and using the model to recognize objects in a query image. In a learning phase, the local bi-gram model is constructed that represents objects found in a set of training images. The local bi-gram model is a local spatial model that only models the relationship of neighboring features without any knowledge of their global context. Object recognition is performed by finding a set of matching primitives in the query image. A tree structure of matching primitives is generated and a search is performed to find a tree structure of matching primitives that obeys the local bi-gram model. The local bi-gram model can be found using unsupervised learning. The system and method also can be used to recognize objects unsupervised that are undergoing non-rigid transformations for both object instance recognition and category recognition.

20 Claims, 15 Drawing Sheets

OTHER PUBLICATIONS

Comaniciu, D., P. Meer, Mean shift: A robust approach toward a feature space analysis, IEEE Trans. on Pattern Analysis and Mach. Intelligence, 2002, vol. 24, pp. 603-619.

Crandall, D., P. Felzenszwalb, D. Huttenlocher, Spatial priors for part-based recognition using statistical models, Proceedings of the 2005 IEEE Comp. Soc. Conf. on Comp. Vision and Pattern Recognition (CVPR'05), 2005, pp. 10-17.

Crandall, D.J. and D. P. Huttenlocher, Weakly supervised learning of part-based spatial models for visual object recognition, 2006, pp. 16-29.

Felzenszwalb, P.F., Representation and detection of deformable shapes, IEEE Transactions on Pattern Recognition and Machine Intelligence, 2005, pp. 208-220, vol. 27, No. 2.

Fergus, R., P. Perona, A. Zisserman, Object class recognition by unsupervised scale-invariant learning, Proc. of the IEEE Conf. on Comp. Vision and Pattern Recognition, 2003, pp. 264-271, vol. 2.

Harris, C., and M. Stephens, A combined corner and edge detector, ALVEY Vision Conf., 1988, pp. 147-151.

Kadir, T. and M. Brady, Scale, saliency and image description, Int'l J. of Comp. Vision, Nov. 2001, pp. 83-105, vol. 45, No. 2.

Lazebnik, S., C. Schmid, J. Ponce, Sparse texture representation using affine-invariant neighborhoods, Proc. of the Conf. on Computer Vision and Pattern Recognition, 2003, vol. 2, pp. 319-324, Madison, Wisconsin, USA.

Li, Y., Y. H. Tsin, Y. Genc and T. Kanade, Statistical shape models for object recognition and part localization, 2006, pp. 699, vol. 2.

Lowe, D., Distinctive image features from scale-invariant keypoints, Int'l. J. of Comp. Vision, 2004, vol. 60, No. 2, pp. 91-110.

Matas, J., O. Chum, M. Urban and T. Pajdla, Robust wide-baseline stereo from maximally stable extremal regions, Image and Vision Computing, Sep. 1, 2004, pp. 761-767, vol. 22, No. 10.

Mikolajczyk, K. and C. Schmid, Scale and affine invariant interest point detectors, Int'l J. of Comp. Vision, 2004, pp. 63-86, vol. 60, No. 1.

Moreels, P., P. Perona, Probabilistic coarse-to-fine object recognition, submitted, Int'l J. of Comp. Vision, 2007.

Nistér, D., and H. Stewénius, Scalable recognition with a vocabulary tree, IEEE Conf. on Comp. Vision and Pattern Recognition (CVPR), Jun. 2006, vol. 2, pp. 2161-2168.

Pipitone, F., and W. Adams, Tripod operators for recognizing objects in range images: Rapid rejection of library objects, Proc. of the IEEE Conf. on Robotics and Automation, May 1992, pp. 1596-1601, vol. 2.

Pulli, K. and L. G. Shapiro, Triplet-based object recognition using synthetic and real probability models, Proc. of ICPR96, 1996, vol. IV, pp. 75-79.

Rothganger, F., S. Lazebnik, C. Schmid, and J. Ponce, 3D object modeling and recognition using local affine-invariant image descriptors and multi-view spatial constraints, Int'l J. of Comp. Vision, Mar. 2006, pp. 231-259, vol. 66, No. 3.

Sivic, J., B. C. Russell, A. A. Efros, A. Zisserman, W. T. Freeman, Discovering objects and their location in images, Tenth IEEE International Conference on Computer Vision, Oct. 17-21, 2005, pp. 370-377, vol. 1.

Sivic, J. and A. Zisserman, Video Google: A text retrieval approach to object matching in videos, Proc. of the Int'l Conf. on Computer Vision, Oct. 2003, pp. 1470-1477, vol. 2.

Weber, M., M. Welling, and P. Perona, Unsupervised learning of models for recognition, European Conf. on Comp. Vision, 2000, pp. 18-32, vol. 1.

* cited by examiner

LOCAL BI-GRAM MODEL FOR OBJECT RECOGNITION

BACKGROUND

Object recognition is an important area of computer vision. Object recognition includes recognizing classes of objects (object category recognition) and recognizing individual objects (object instance recognition). The goal of object category recognition is to automatically recognize unknown object instances of known categories (such as cars or faces) and assign the object to the correct category. The goal of object instance recognition is to recognize a specific instance of an object (such as a specific car or person).

Both object category recognition and object instance recognition remain challenging problems in computer vision. Some of the most promising approaches to solving these challenging problems are feature-based techniques. In general, feature-based techniques extract local features or matching primitives from descriptors from salient points in an image. This is achieved by locating "interest points", which are points in the image having a location, a scale, and sometimes a rotation. The interest points typically have a high variance in each surrounding direction. A feature is an interest point plus interest patch of pixels around and centered on the interest point. A matching primitive can be a set of multiple features grouped together in twos (a doublet), in threes (a triplet), as well as single features (a singlet). A feature is a subset of the set of matching primitives. To be highly discriminative, a feature or matching primitive should be able to be recognized in an image repeatedly. For example, a feature could be a dark spot on a white background, or a corner of an object. Recognition is achieved by matching features from a query image with those found from a set of training images. The effectiveness of these methods relies mainly on the discriminative power of the features.

Recently techniques that additionally model the spatial relationship of features have shown improved results. This is especially true for object category recognition, where the appearance of features across intra-class objects can vary more dramatically than object instance recognition. Several types of spatial models have been developed, including the constellation model, star models, rigid 3D models, and image-centric or warping techniques. Each of these methods creates a global spatial model for an object, whether they are parts-based, image-based or full three-dimensional (3-D) model. Moreover, another feature-based technique uses a triplet approach to group features into a set of three and then looks for matches. The general idea is to verify the geometric location and the spatial relationship of triplets relative to each other using a global model.

One drawback, however, to the global spatial model is the need to assume that the object in the image is semi-rigid in space. Any deformation in the global spatial model will reduce object recognition reliability. Another drawback is that the use of a global model typically requires a model of an object for each permutation or variation of the object. For example, if the object is a human face, the global model framework requires a model of a face for each type of face, such as with a mustache, without a mustache, with glasses, without glasses, and so forth. This requires a great deal of models and training data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The local bi-gram model object recognition system and method includes a local feature-based model for object recognition. This local bi-gram model includes spatial relationships between matching primitives that are modeled using a purely local bi-gram representation consisting of transition probabilities between neighboring primitives. Matching primitives should be both discriminative between different types of objects and predictive of the local structure in an object. To achieve highly efficient object recognition, the local bi-gram model uses both single features (or singlets) as well as sets of two neighboring features (or doublets) or three neighboring features (or triplets) as our matching primitive. By combining features into sets, the discriminative power is increased over single features. Multiple feature positions can also be used to compute robust similarity and affine transformations to better predict the local position of neighboring features. In other words, addition of doublets and triplets provides a highly discriminative matching primitive and a reference frame that is invariant to similarity or affine transformations.

The local bi-gram model is a local spatial model without any explicit global model of an object. In other words, only the relationship of neighboring features is modeled without any knowledge of their global context. An illustrative analogy can be made between the local bi-gram model and the task of language modeling. Specifically, in language modeling the goal is to model the spatial relationship of words in sentences. Most global language model methods attempt to model the entire sentence structure, such as a noun phrase, a verb phrase, and so forth. Local language models, on the other hand, only attempt to model the structure of neighboring words. One such local language model is the n-gram language model. An n-gram language model uses the previous n−1 words in a sentence to predict the probability of the next word. When n=2, the language model is known as a bi-gram language model. In the language modeling community, these simplistic local techniques have shown respectable results in comparison to the more complex global techniques. Similarly to the n-gram language model, the local bi-gram model object recognition system and method uses a bi-gram model for object recognition. This means that a "word" or matching primitive in the local bi-gram model is only dependent on a single matching primitive preceding it in the model.

Unlike the one-dimensional problem of language modeling, in which a strict ordering of words is enforced in a string, matching primitives in object recognition have no explicit order. Moreover, multiple matching primitives can be dependent on each other. In order to handle these more complex relationships that are encountered in object recognition, the local bi-gram model object recognition system and method uses a tree structure instead of a string. The tree structure provides an efficient local representation with an inherent ordering that allows for multiple matching primitives to be dependent on a single parent.

Object recognition includes comparing these tree structures of matching primitives in a query image to the local bi-gram model. Objects are recognized by finding tree structures of matching primitives in a query image that obey the local bi-gram model learned for a specific class of objects. The system and method are able to generate large tree structures of matching primitives corresponding to objects learned by the local bi-gram model across a variety of objects.

A local bi-gram model can also be found using unsupervised learning. The system and method also are capable of discovering objects unsupervised, even if the objects are deforming and rotating. In other words, the system and method can recognize objects undergoing non-rigid transformations for both object instance recognition and category recognition.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of the local bi-gram model object recognition system and method, reference is made to the accompanying drawings, which form a part thereof, and in which is shown by way of illustration a specific example whereby the local bi-gram model object recognition system and method may be practiced. It is to be understood that other embodiments may be utilized and structural changes may be made without departing from the scope of the claimed subject matter.

I. General Overview

Figure 1:
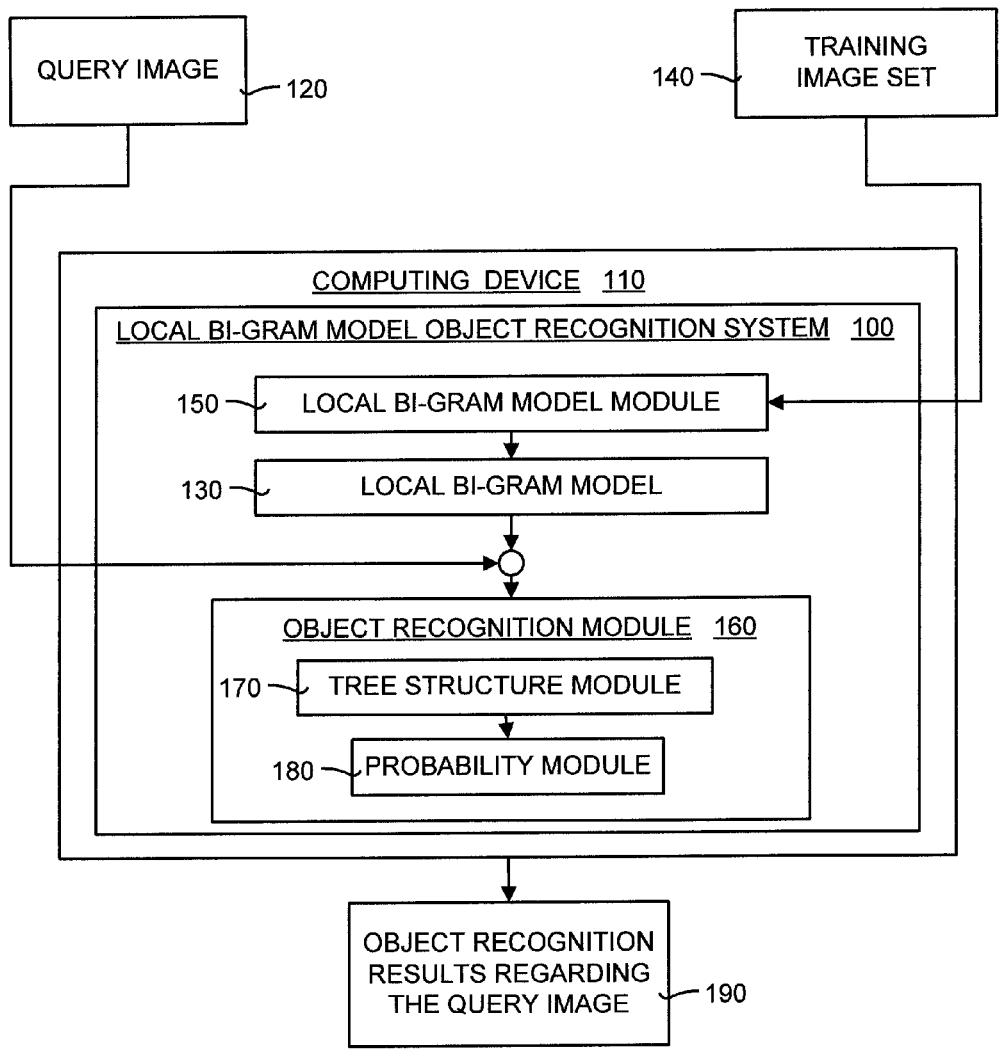
FIG. 1 illustrates an exemplary implementation of the local bi-gram model object recognition system and method disclosed herein.

The general idea of the local bi-gram model object recognition system and method is to construct a local bi-gram model representing local relationships between matching primitives and to use that model to recognize an object in a query image. FIG. 1 illustrates an exemplary implementation of the local bi-gram model object recognition system and method disclosed herein. It should be noted that FIG. 1 is merely one of several ways in which the local bi-gram model object recognition system and method may implemented and used.

Referring to FIG. 1, the local bi-gram model object recognition system 100 resides on a computing device 110. In general, the local bi-gram model object recognition system 100 builds a local bi-gram model and then finds repeatable features between a query image 120 and the local bi-gram model 130. More specifically, as shown in FIG. 1, the local bi-gram model object recognition system 100 first constructs a local bi-gram model. This accomplished in part by using a training image set 140 and having a local bi-gram model module 150 learn objects as local relationships between matching primitives in the training image set 140. The output of the local bi-gram model module 150 is the local bi-gram model 130.

An object recognition module 160 is used to recognize objects give the local bi-gram model 130. In particular, the query image 120 that may or may not contain an object is input to the object recognition module 160. In addition, the local bi-gram model 130 in input to the object recognition module 160. The module 160 includes a tree structure module 170 and a probability module 180. The tree structure module 170 finds a set of neighboring primitives that obey the local bi-gram model and generates a tree structure. The probability module computes the probability or likelihood that the tree structure represents an object in the query image 120. Results of the object recognition processing regarding the query image 190 are output from the local bi-gram model object recognition system 100.

By way of example assume that it is desired to find a human face in the query image 120. The face is represented using a local representation, or, in other words, for each matching primitive only the local relationship of the primitive is stored. The local relationship means that for the face all that is done is to store a matching primitive relative to, for example, an eye on the face. Thus, for each matching primitive all the neighboring matching primitives are stored relative to a local reference frame.

These matching primitives and neighboring matching primitives are used to represent the local bi-gram model of the object. In order to recognize the object in the query image a structure of matching primitives is found that obey the model. This is done by finding tree structures of matching primitives.

For example, using the tree structure a matching primitive is found and then tree is branched out to where another matching primitive should be. If another matching primitive is there, then a link between the original matching primitive and the neighboring matching primitive is found. The iterative process continues branching out to create new tree structure that branches out that obeys the model.

Once the tree structure is built for a set of matching primitives, a probability of an object being a certain object (such as a face) or being the background is computed. Initially, the tree structure has a very high likelihood of being a background. But each time a matching primitive is found that obeys the model the more nodes are found on the tree. This increases the probability of the tree structure being the object (in this case, a face). Thus, if a tree never obtains a certain size, then its probability of being a certain object will never be greater than it being part of the background. Then the results will be that the certain object was not found in the query image. It should be noted that there is no explicit penalty for not finding an object.

II. Operational Overview

Figure 2:
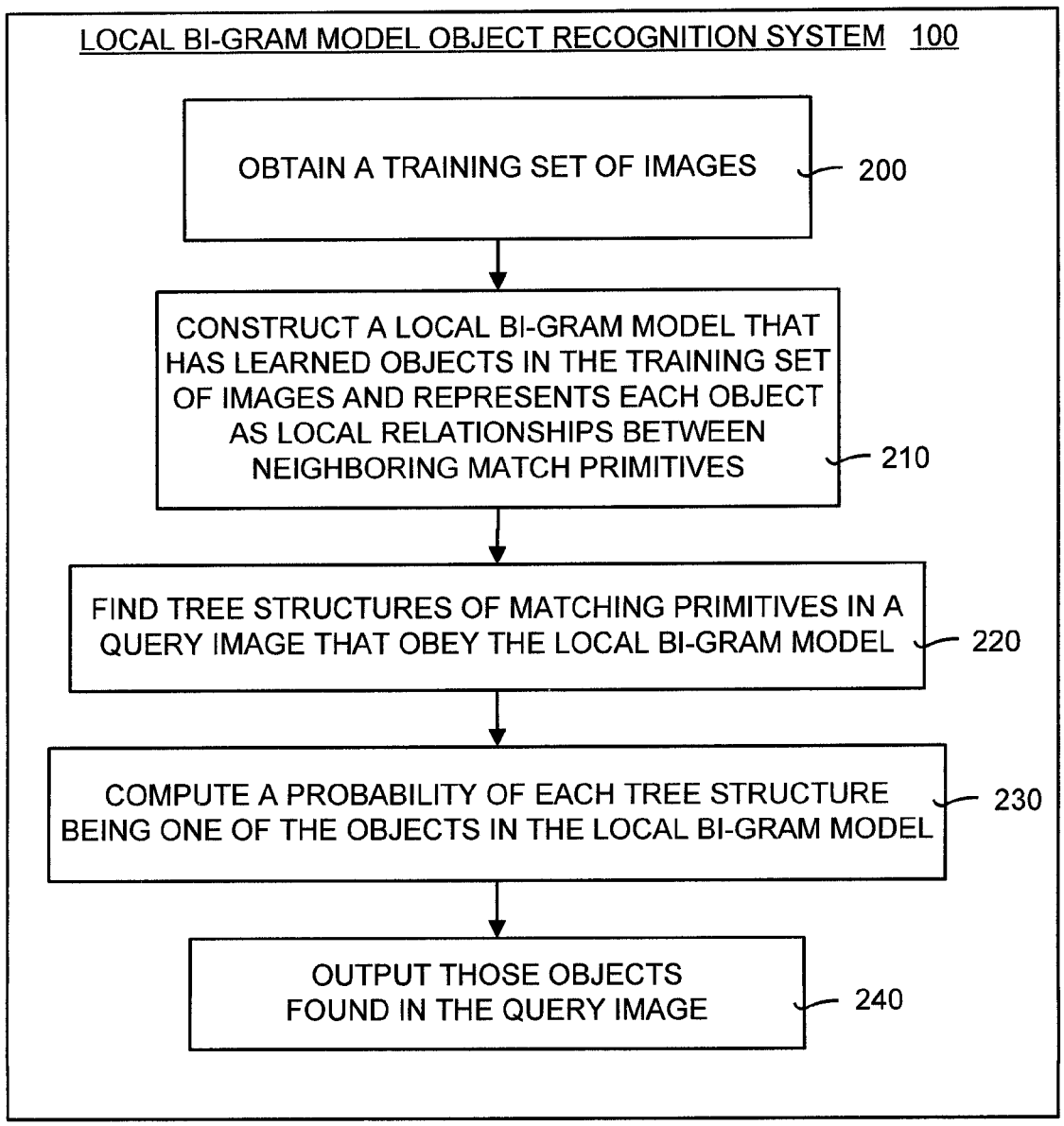
FIG. 2 is a flow diagram illustrating the general operation of the local bi-gram model object recognition system shown in FIG. 1.

FIG. 2 is a flow diagram illustrating the general operation of the local bi-gram model object recognition system 100 shown in FIG. 1. In general, the local bi-gram model object recognition method generates a local bi-gram model and uses that model to recognize objects in a query image. More specifically, the local bi-gram model object recognition method initially inputs a training set of images (box 200). Next, the local bi-gram model is constructed that has learned object in the training set of images (box 210). The local bi-gram model represents each object as local relationships between neighboring primitives.

The local bi-gram model object recognition method then finds tree structures of matching primitives in a query image (box 220). The tree structures are such that they obey the local bi-gram model. The method then computes a probability of each tree structure being one of the objects represented in the local bi-gram model (box 230). The method outputs those objects found in the query image (box 240).

The local bi-gram model object recognition system and method uses a local spatial model without any explicit global model of an object. The local bi-gram model object recognition system and method only models the relationship of neighboring features without knowledge of their global context. An illustrative analogy can be made between the local bi-gram model object recognition system and method and the task of language modeling. In language modeling, the goal is to model the spatial relationship of words in sentences. Most global methods attempt to model the entire sentence structure, noun phrase, verb phrase, and so forth. Local models only attempt to model the structure of neighboring words, such as the n-gram model.

An n-gram model is a language model that is used to estimate the probability of a sequence of speech units, such as the likelihood of one word following another. An n-gram model uses the previous n−1 words in a sentence to predict the probability of the next word. In the language modeling community, these simplistic local techniques have shown respectable results in comparison to the more complex global techniques. When n=2 the language model is called a bi-gram model. The bi-gram model gives the probability of a subsequent word in a string given the preceding word. Similar to the n-gram language model, the local bi-gram model object recognition system and method uses a bi-gram model for object recognition. In other words, each "word" or matching primitive in the local bi-gram model used by the local bi-gram model object recognition system and method is dependent only on a single word preceding it in the model.

A critical design element is the choice of matching primitive. This primitive should be both discriminative between different types of objects and predictive of the local structure within an object. Existing methods typically use single features, such as SIFT, for this purpose. In addition to using single features, the local bi-gram model object recognition system and method uses sets of two or three neighboring features as matching primitives. By combining features into sets, the discriminative power is increased over single features. Multiple feature positions can also be used to compute robust similarity and affine transformations to better predict the local position of neighboring features.

Unlike the one-dimensional problem of language modeling in which a strict ordering of words is enforced in a string, words or matching primitives in object recognition have no explicit order. Moreover, multiple matching primitives can be dependent on each other. To handle this more complex relationship, the local bi-gram model object recognition system and method models the structure of objects using a tree instead of a string. This provides an efficient representation with an inherent ordering that allows for multiple matching primitives to be dependent on a single parent.

III. Operational Details

As discussed generally above, the local bi-gram model object recognition both constructs a local bi-gram model and uses that model for object recognition. This is accomplished in two general steps. In particular, a first step includes a learning phase whereby a local bi-gram model is constructed that represents objects found in a set of training images. This local bi-gram model includes a set of frequently-occurring matching primitives along with a prediction of their neighboring primitives. Only the local relationships are stored, without the global context from which they came. Moreover, a second step includes obtaining a query image and finding a set of matching primitives in the query image. These matching primitives are used to build a tree structure of matching primitives, and a search is performed to find a tree structure of matching primitives that obeys the local bi-gram model found in the learning phrase. Each of these two steps now will be discussed in more detail.

Constructing the Local Bi-Gram Model

In this section, construction of the local bi-gram model is described. This model represents the local relationships between neighboring match primitives in an image. These local relationships are based on the features' descriptors, as well as their local positions and orientations. By only modeling the local interactions of features, a compact model for deformable objects with large variation of appearance can be created.

Figure 3:
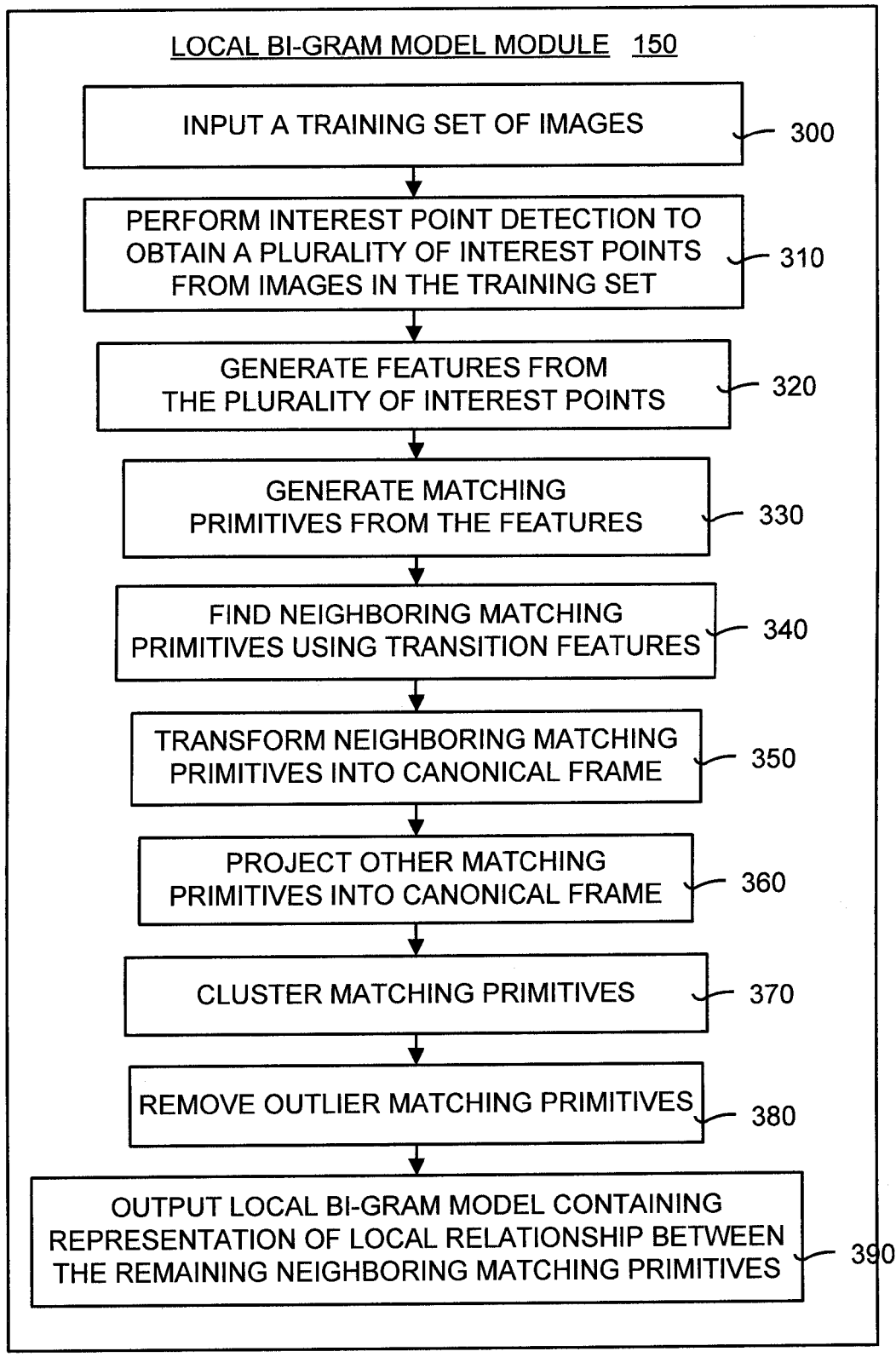
FIG. 3 is a flow diagram illustrating the detailed operation of the local bi-gram module shown in FIG. 1.

FIG. 3 is a flow diagram illustrating the detailed operation of the local bi-gram module 150 shown in FIG. 1. The operation begins by inputting a training set of images (box 300). Next, the module 150 performs interest point detection to on the training set of images to obtain a plurality of interest points (box 310). The module 150 then generates features from the plurality of interest points (box 320).

Matching primitives then are generated from the features (box 330). In addition, neighboring matching primitives are found using transition features (box 340). The module 150 then transforms neighboring matching primitives into a canonical frame (box 350). Other primitives then are projected in the canonical frame (box 360). The matching primitives then are clustered using a clustering technique, as described below (box 370), and outlier matching primitives are removed (box 380). The output is the local bi-gram model that contains a representation of local relationships between the remaining neighboring matching primitives (box 390). The local bi-gram model is used by the local bi-gram model object recognition system and method to recognize objects.

The details of the construction of the local bi-gram model now will be described in further detail in two steps. First, matching primitives and the vocabulary of words created from them are described. Second, the local spatial relationships between the words are learned. These two steps are described in the following sections.

Features Singlets, Doublets, and Triplets

A matching primitive should be both discriminative between different types of objects, and repeatable within a specific class of object. Existing techniques have used single features such as SIFT, corner detectors, maximally stable extremal regions, and salient regions. The use of single features provides a high level of repeatability. However, the occurrence of these features is not unique to a specific object. This is especially true when the features are discretized into a fixed number of clusters. To increase the discriminative power of matching primitives, multiple features can be used, such as doublets or triplets. While this does reduce their repeatability, their uniqueness to a single object class is increased.

In one embodiment of the local bi-gram model object recognition system and method, three approaches using either sets of one, two or three SIFT $\epsilon$ features called singlets, doublets and triplets are used as matching primitives. The use of single SIFT features has shown good performance for a variety of object recognition tasks. The grouping of SIFT features provides additional contextual information. By analogy, in language models, seeing "white" or "house" does not necessarily identify an article's topic as politics, but seeing "white" and "house" closely together greatly increases this probability. Similarly in object recognition, the co-occurrence of features increases their discriminative power over each individual feature. Doublets and triplets are found by grouping features that lie within a certain distance of each other both spatially and in scale space. More specifically, if a feature $f_i$ has a scale $s_i$, the other features in the set must lie within distance $\alpha s_i$ of each other in image space and $\pm \beta$ in log scale space.

In order to increase matching efficiency and to reduce model complexity, the set of feature descriptors are discretized into a set of fixed size. This set is created by clustering the training feature descriptors using a K-means clustering technique. Some embodiments set K=1000, because this approximate size provides a good tradeoff between repeatability and descriptiveness.

The vocabulary is created from the n-tuple (n$\in$\{1,2,3\}) of cluster indices assigned to the feature descriptors. That is, for doublet $d_i$, with two features $f_i^1$ and $f_i^2$ assigned to clusters $c_i^1$ and $c_i^2$, assign word $w_i=\{c_i^1, c_i^2\}$, $w_i \in C \times C$. It is assumed that indices of the clusters are in numerical order, in other words $c_i^1 < c_i^2$. To remove matching ambiguity, all doublets with repeated cluster indices are removed. Singlet and triplet words are similar except they contain 1 or 3 distinctive cluster indices. Using this technique, singlets, doublets and triplets assigned to the same words can be grouped together.

Figure 4:
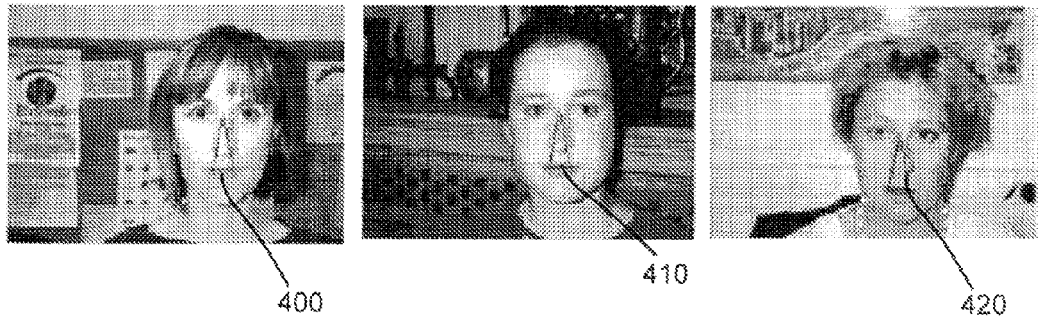
FIG. 4 illustrates a first example of a first set of feature triplets assigned to a first word or matching primitive.
Figure 5:
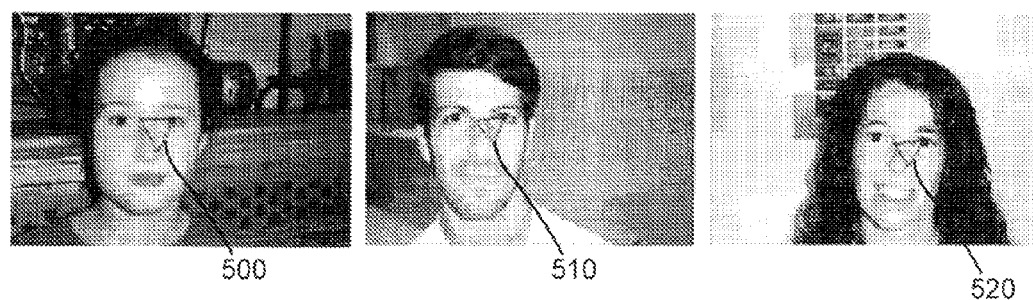
FIG. 5 illustrates a second example of a second set of feature triplets assigned to a second word or matching primitive.

FIG. 4 illustrates a first example of a first set of feature triplets assigned to a first word or matching primitive. The feature triplets 400, 410, 420 are shown as triangles on each of the faces. FIG. 5 illustrates a second example of a second set of feature triplets assigned to a second word or matching primitive. The feature triplets 500, 510, 520 are also shown as triangles on each of the faces. The largest theoretical size of the vocabulary is $$\binom{1000}{2}$$

for doublets and $$\binom{1000}{3}$$

for triplets. In practice, an object will only contain a small fraction of these sets.

Learning Local Relationships

Figure 6:
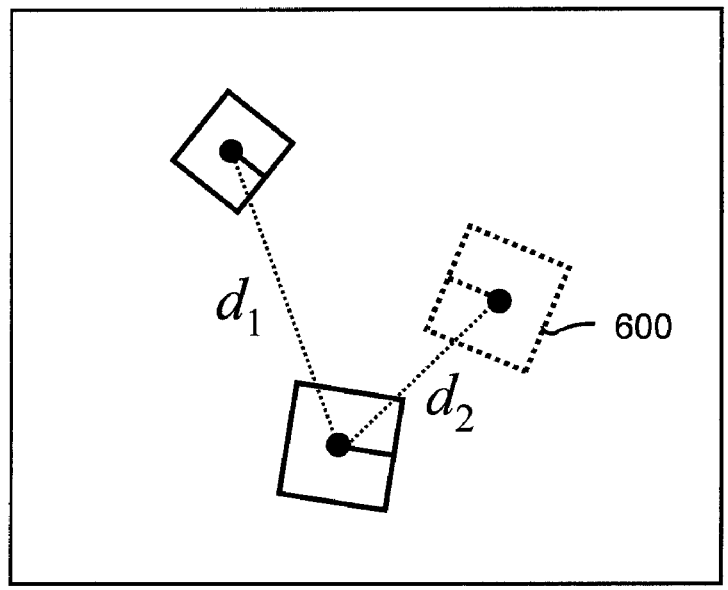
FIG. 6 illustrates an example of a neighboring doublet, which share a single feature.
Figure 7:
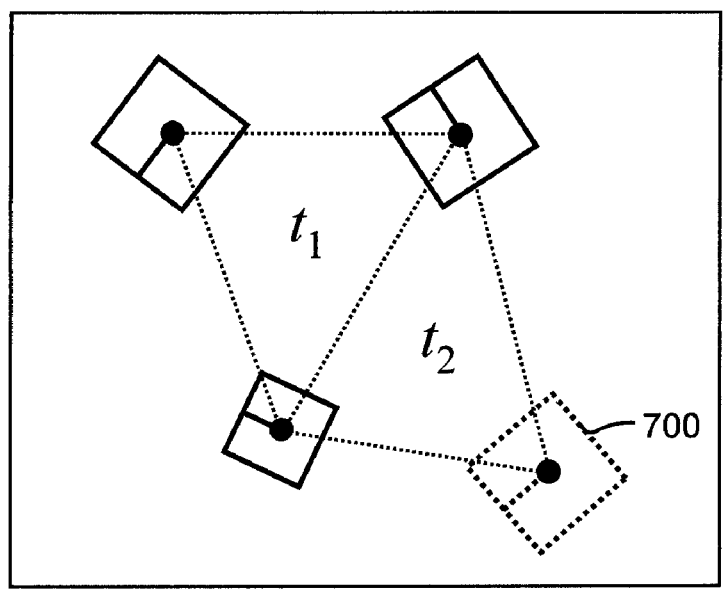
FIG. 7 illustrates an example of a neighboring triplet, which share two features.

The next task is to learn the local relationships of neighboring matching primitives. FIG. 6 illustrates an example of a neighboring doublet. In particular, as shown in FIG. 6, two doublets, $d_1$ and $d_2$, are said to be neighboring if they share a single feature. FIG. 7 illustrates an example of a neighboring triplet. As shown in FIG. 7, two triplets, $t_1$ and $t_2$, are said to be neighboring if they share two features. Singlets are neighboring if they lie within a certain distance in image and scale space. This is the same criterion as in the construction of doublets. In each case, there exists one feature in each set not shared by the other set. This feature is called the transition feature of its set with respect to the transition from the other set. More specifically, the transition feature of doublet $d_i$ with respect to the transition from doublet $d_j$ is denoted as $f_i(j) \in \{f_i^1, f_i^2\}$, and similarly for pairs of singlets and triplets.

Examples of transition features can be seen in FIGS. 6 and 7. Referring again to FIG. 6, the doublet transition feature 600 is shown by the heavy dashed line. Similarly, referring to FIG. 7, the triplet transition feature 700 is shown by the heavy dashed line.

The local bi-gram model includes a set of transition probabilities between neighboring primitives, for a given object or an object category $O_l$. For simplicity, how to compute the doublet transition probability will be discussed first. Since neighboring doublets share all but one feature between them, the task of computing the probability of $p(d_i|d_j, O_l)$ can be reduced to computing $p(f_i(j)|d_j, O_l)$ for all $d_i \in N_j$, where $N_j$ are all neighbors of $d_j$. A feature $f\square$ contains its location x, orientation $\theta$, and cluster index c, where $f\square=\{x,\theta,c\}$. Thus, a doublet $d_j$ includes two features $f_j^1$ and $f_j^2$ with two positions $x_j^1$ and $x_j^2$, orientations $\theta_j^1$ and $\theta_j^2$, and cluster indices $c_j^1$ and $c_j^2$. In the model the doublet $d_j$ is identified by its corresponding word $w_j=\{c_j^1, c_j^2\}$. Thus, $$p(f_i(j)|d_j,O_l)=p(\{x_i(j),\theta_i(j),c_i(j)\}|\{x_j^1,x_j^2,\theta_j^1,\theta_j^2,w_j\},O_l). \quad (1)$$

Figure 8:
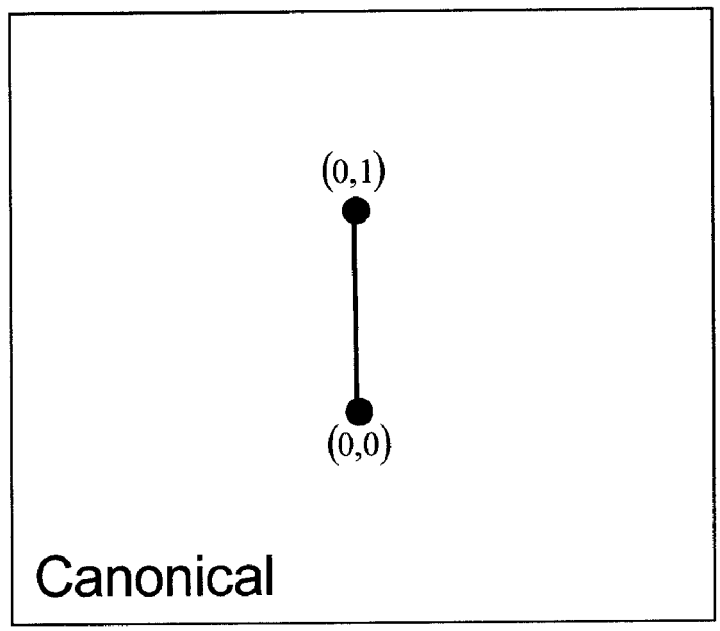
FIG. 8 is an illustration of a doublet position in a canonical frame.

Spatial relationships are modeled conditional on word assignment and are enforced in a canonical frame. FIG. 8 is an illustration of a doublet position in the canonical frame, where $x_j^1$ projects to (0,0) and $x_j^2$ projects to (0,1). This provides invariance up to a similarity transformation (translation, rotation and scale). Let $A_j$ be a 3×3 matrix transforming homogeneous coordinates $x_j^1$ and $x_j^2$ to (0,0) and (0,1), respectively. If $\hat{x}_i(j)$ and $\hat{\theta}_i(j)$ are feature $f_i(j)$'s position and orientation in the canonical frame defined by $A_j$, $$p(f_i(j)|d_j,O_l)=p(\{\hat{x}_i(j),\hat{\theta}_i(j),c_i(j)\}|w_j,O_l) \quad (2)$$

Figure 9:
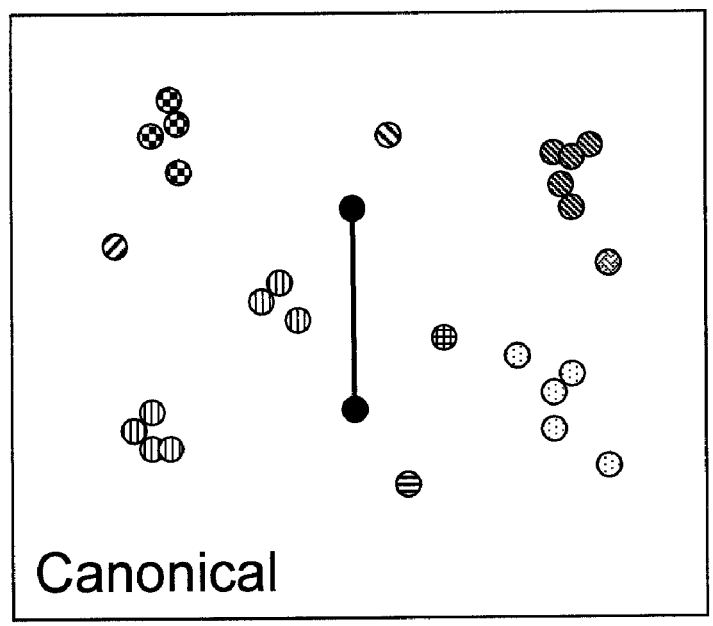
FIG. 9 illustrates the projection of the transition features from neighbors for the doublet shown in FIG. 8.

The value of equation (2) can be understood by examining a training data set. First, a set of transition features $F(w_j)$ is found from all neighboring doublets to doublets that are assigned to the word $w_j$ in the training data. Next, each transition feature $f_k \in F(w_j)$ is projected into the canonical frame based on the neighboring doublets relative positions. FIG. 9 illustrates the projection of the transition features from neighbors for the doublet shown in FIG. 8. The different fill patterns or shadings in FIG. 9 represent different transition features from different clusters obtained using the K-means clustering technique.

To represent the set of possible transition features, in some embodiments several models may be used, such as a local Gaussian perturbation model or a Gaussian Mixture Model (GMM). The GMM allows the modeling of groups of transition features assigned to the same words using a Gaussian with computed means and variances. Since the number of Gaussians needed to represent the distribution is unknown and varies across doublets, in some embodiments the transition features are clustered using a mean shift clustering technique. For mean shift clustering, features are clustered based on their appearance, position and orientation. The iterative update equation for mean shift clustering as used by the local bi-gram model object recognition system and method is, $$\left\{x_k^{\prime t}, \theta_k^{\prime t}\right\} = \frac{\sum_i x_i^{\prime} \mathcal{N}\left(x_i^{\prime}; x_k^{\prime t-1}, \sigma_x^2\right) \mathcal{N}\left(\theta_i^{\prime}; \theta_k^{\prime t-1}, \sigma_\theta^2\right) \delta(c_i, c_k)}{\sum_i \mathcal{N}\left(x_i^{\prime}; x_k^{\prime t-1}, \sigma_x^2\right) \mathcal{N}\left(\theta_i^{\prime}; \theta_k^{\prime t-1}, \sigma_\theta^2\right) \delta(c_i, c_k)}. \quad (3)$$

The function N is the standard Normal distribution over the spatial coordinates in the canonical frame. In some embodiments, standard deviations of $\sigma_x = 0.4$ and $\sigma_\theta = 0.25^\pi$ are used for position and orientation in the canonical frame.

Figure 10:
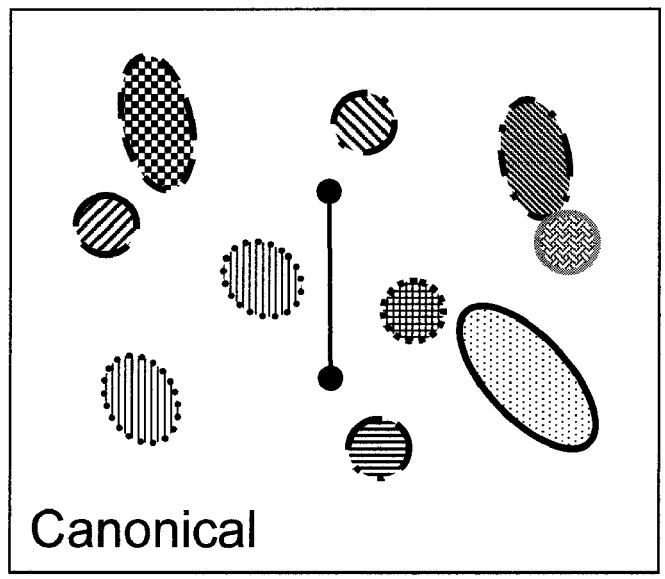
FIG. 10 illustrates an example of the doublet of FIGS. 8 and 9 after mean shift clustering.

Features are clustered together based on their assigned cluster indices. Mathematically, this can be written as $\delta(c_i, c_k) = 1$ if $c_i = c_k$ and 0 otherwise. Thus, only features assigned to the same cluster indices with similar positions and orientations are clustered together. FIG. 10 illustrates an example of the doublet of FIGS. 8 and 9 after this mean shift clustering. The different shadings and line dashings represent the different clusters.

Figure 11:
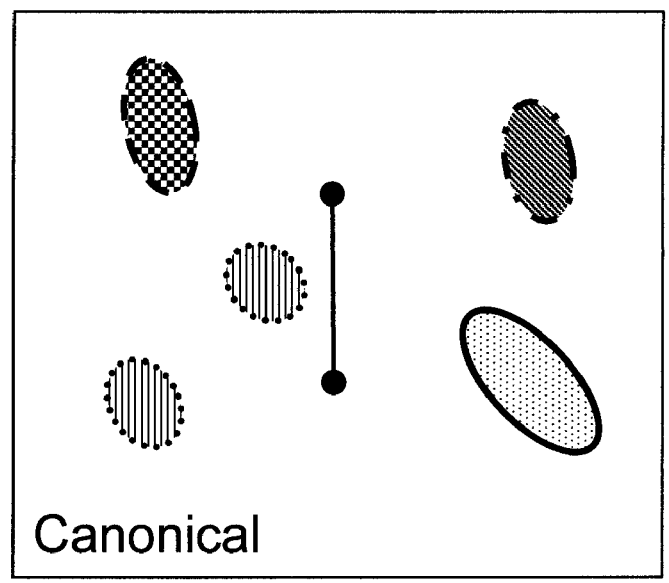
FIG. 11 illustrates a final model of the example of FIGS. 8, 9, and 10 after the thresholding cluster size.

To ensure the compactness of the model, only doublets that occur at least $\psi$ times in the training data are kept. Further, clusters of transition features that have less than $\omega$ members are discarded. FIG. 11 illustrates the final model of the example of FIGS. 8, 9, and 10 after the thresholding cluster size. The different shadings and line dashings represent different clusters. In some embodiments $\psi=3$ and $\omega=3$.

After mean shift clustering, the transition probabilities are represented by a set of Gaussians, each of which is factored into appearance, position and orientation components. This results in a transition probability for $p(f_i(j)|d_j)$ being equal to the summation over all the Gaussian components index by $a_i$, $$p(f_i(j)|d_j, O_l) = \sum_a p(a) \Delta(f_i(j), c_a) \mathcal{N}\left(x_i(j); x_a^{\prime}, \sum_x(a)\right) \mathcal{N}\left(\theta_i(j); \theta_a^{\prime}, \sigma_\theta(a)^2\right) \quad (4)$$

The similarity in appearance is computed using $\Delta(f_i(j), c_a)$, which is described in detail below. The spatial covariance matrix $$\sum_x (a)$$

and orientation variance $\sigma_\theta(\alpha)^2$ are computed separately for each Gaussian component in the GMM based on the training data. Note that $p(\alpha)$ is the prior probability for each component in the GMM.

The transition probabilities for neighboring feature singlets and triplets are learned in the same manner as those learned for doublets. The only exception is how the transform $A_j$ is computed. The similarity transform for the canonical frame of singlets is computed from the feature's position, scale and orientation.

Figure 12:
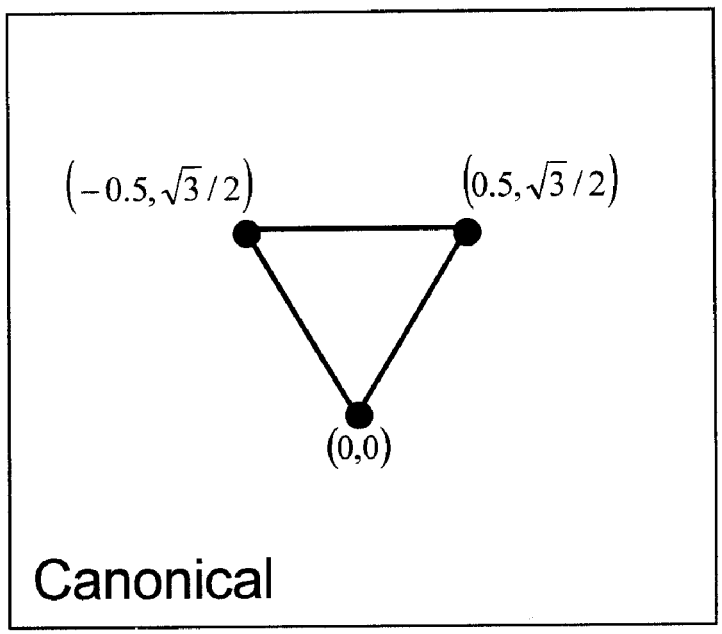
FIG. 12 is an illustration of a triplet position in the canonical frame.
Figure 13:
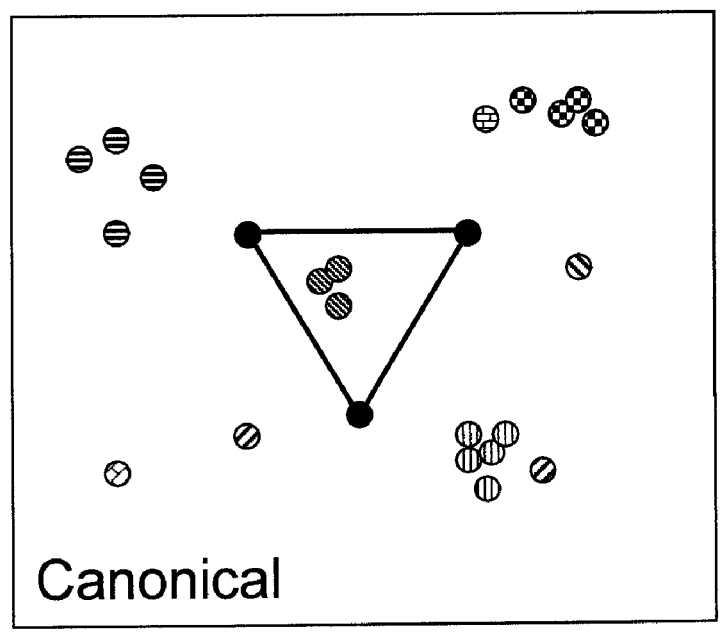
FIG. 13 illustrates the projection of the transition features from neighbors for the triplet shown in FIG. 12.
Figure 14:
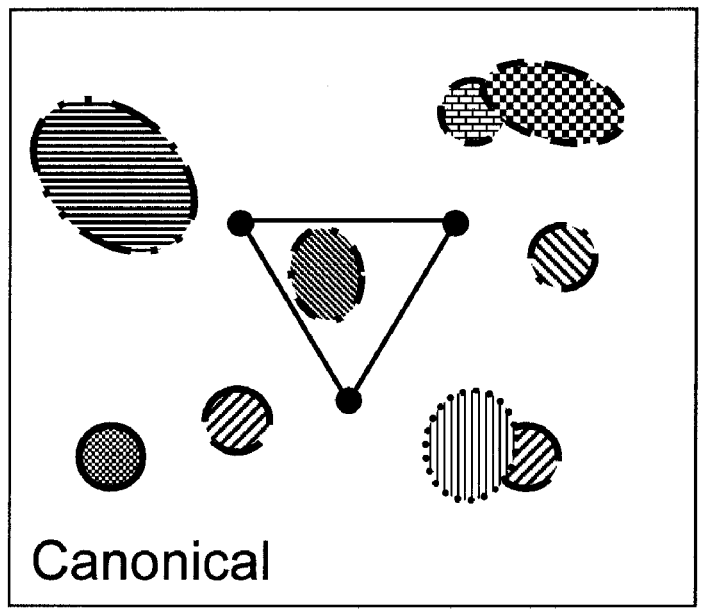
FIG. 14 illustrates an example of the triplet of FIGS. 12 and 13 after mean shift clustering.
Figure 15:
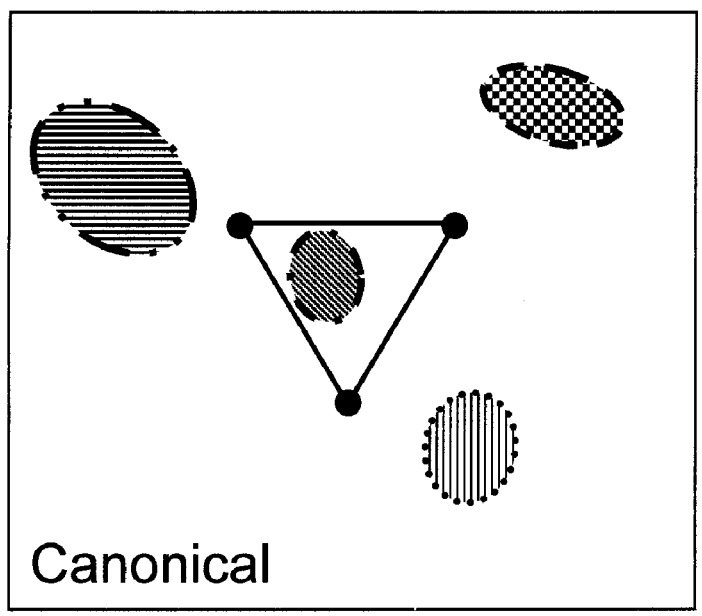
FIG. 15 illustrates the final model of the example of FIGS. 12, 13, and 14 after the thresholding cluster size.

FIG. 12 is an illustration of a triplet position in the canonical frame, where the three feature positions are projected to the positions (0,0), ($-0.5,\sqrt{3}/2$), ($0.5,\sqrt{3}/2$) corresponding to an equilateral triangle in the canonical frame. This provides invariance to an affine transformation, and not just a similarity transformation. Once the transition features are projected into the canonical frame, the GMM is computed as described above. In particular, FIG. 13 illustrates the projection of the transition features from neighbors for the triplet shown in FIG. 12. The different fill patterns or shadings in FIG. 13 represent different transition features from different cluster obtained using the K-means clustering technique. FIG. 14 illustrates an example of the triplet of FIGS. 12 and 13 after this mean shift clustering. FIG. 15 illustrates the final model of the example of FIGS. 12, 13, and 14 after the thresholding cluster size. The different shadings and line dashings represent the different clusters.

Figure 16:
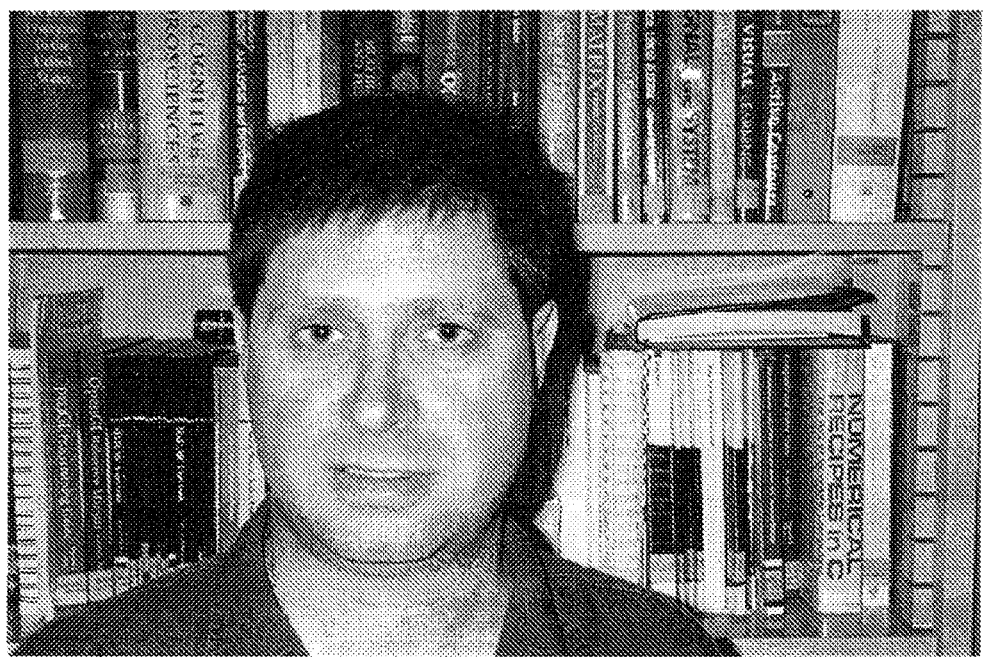
FIG. 16 illustrates an input image to the local bi-gram model object recognition system and method from a face data set.
Figure 17:
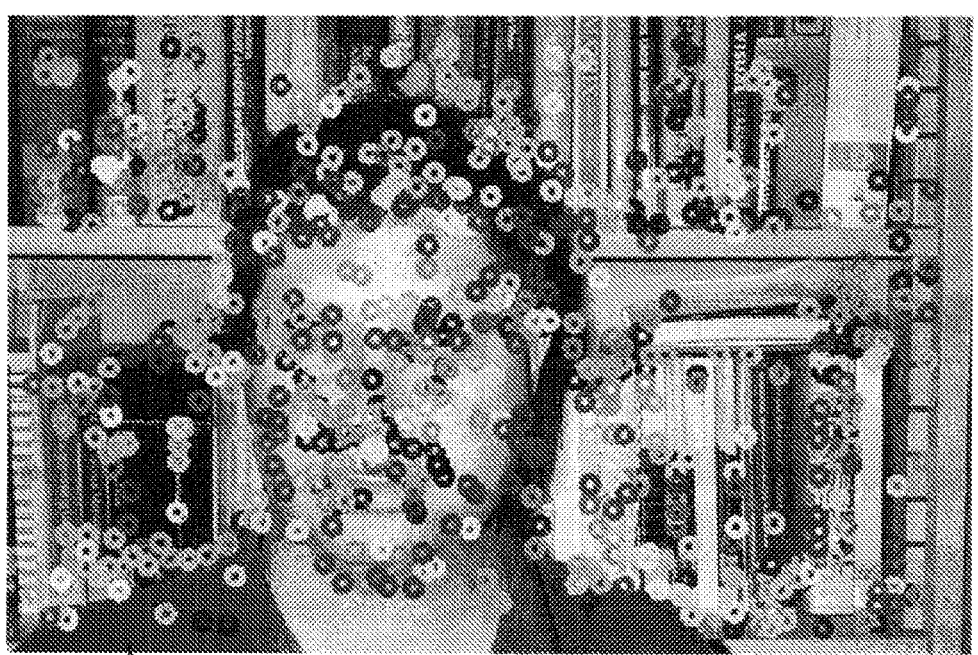
FIG. 17 illustrates the frequency of occurrence for singlets given the input image of FIG. 16.
Figure 18:
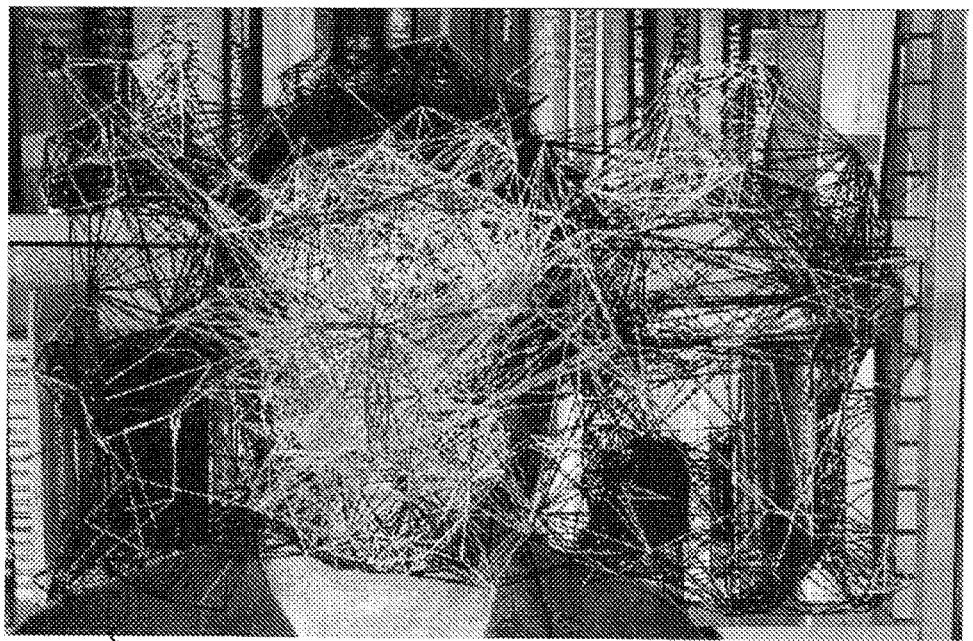
FIG. 18 illustrates the frequency of occurrence for doublets given the input image of FIG. 16.
Figure 19:
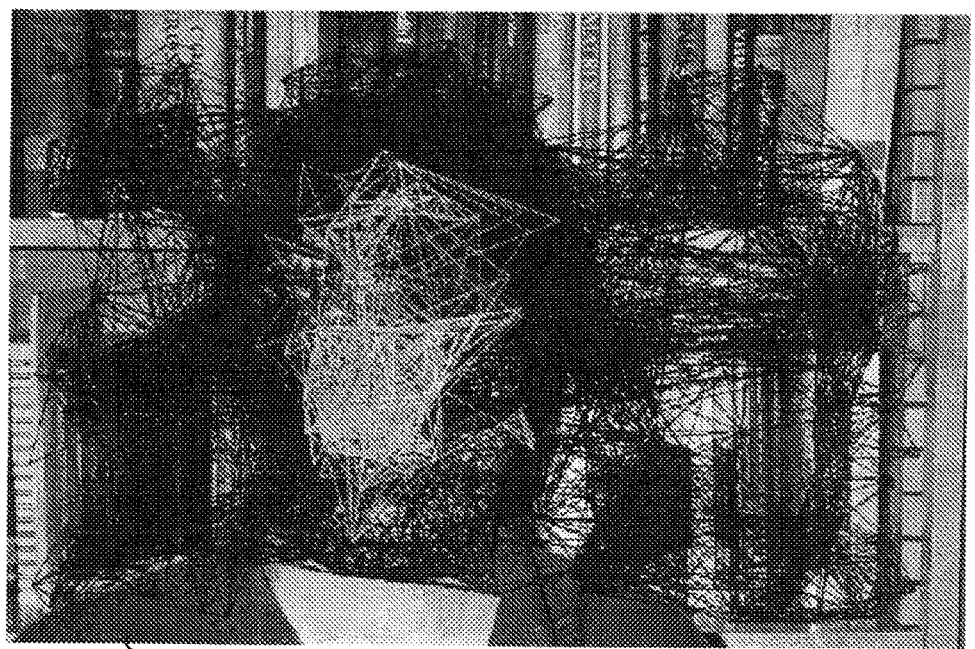
FIG. 19 illustrates the frequency of occurrence for triplets given the input image of FIG. 16.

FIGS. 16, 17, 18, and 19 illustrate a working example of a set of singlets, doublets and triplets that were found using the local bi-gram model constructed as described above on the Caltech 101 face data set. In particular, FIG. 16 illustrates the input image 1600 to the local bi-gram model object recognition system and method from the Caltech 101 face data set. This data set is well known to those having ordinary skill in the art. FIG. 17 illustrates the frequency of occurrence for singlets given the input image 1600 of FIG. 16. Note that the singlets in FIG. 17 are depicted by circles. The different grayscale shadings encodes the frequency of occurrence for each matching primitive in our model. In FIGS. 17, 18, and 19, a darker grayscale shading indicates low occurrence and a lighter grayscale shading indicates high occurrence. FIG. 18 illustrates the frequency of occurrence for doublets given the input image 1600 of FIG. 16. The doublets in FIG. 18 are represented by lines. Similarly, FIG. 19 illustrates the frequency of occurrence for triplets given the input image 1600 of FIG. 16. The triplets in FIG. 19 are illustrated by triangles. It should be noted in FIG. 19 that the triplets with high occurrence are centered on the face and absent from the background image. This means that the triplets are highly discriminative as compared to the singlets and doublets. Referring again to FIG. 17, it can be seen that singlets are less discriminative than the triplets and doublets and scattered over the face and background image.

Recognizing Objects

One goal of the local bi-gram model object recognition system and method is to find objects in a new image given a set of matching primitives in the local bi-gram model. In other words, given the local bi-gram object model, this task is transformed into finding a set of neighboring primitives that obey the model. The local bi-gram model object recognition system and method accomplishes this by using an efficient and simple technique that involves using trees of matching primitives. The children in a tree permit the modeling of many possible neighbors that a primitive might have in its two-dimensional (2-D) neighborhood. As a result, the goal generally is transformed into finding a tree of matching primitives with high likelihood of belonging to a specific object.

Figure 20:
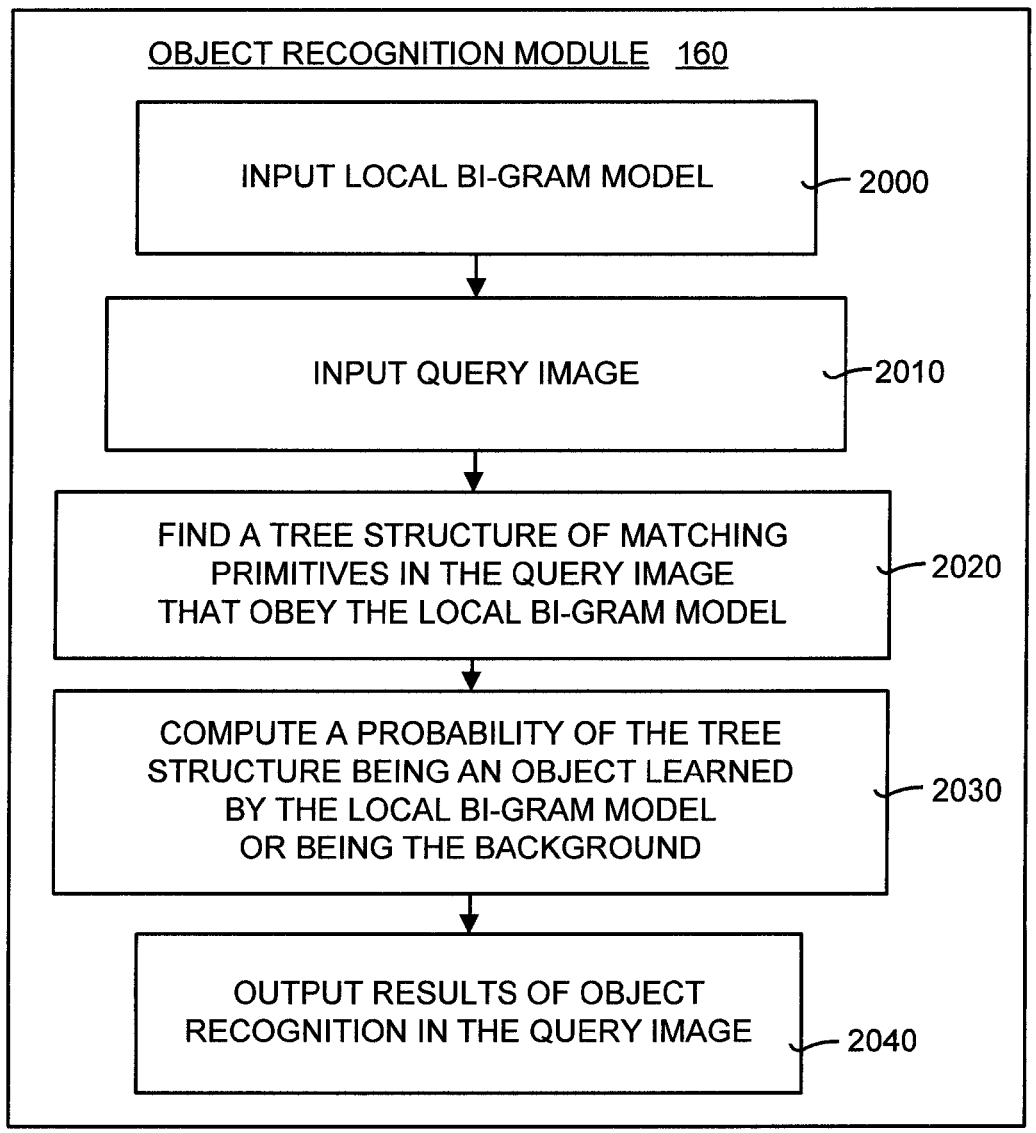
FIG. 20 is a flow diagram illustrating the detailed operation of the object recognition module shown in FIG. 1.

FIG. 20 is a flow diagram illustrating the detailed operation of the object recognition module 160 shown in FIG. 1. The operation begins by inputting the local bi-gram model (box 2000) and a query image (box 2010). The module 160 then finds a tree structure of matching primitives in the query image that obey the local bi-gram model (box 2020). Next, a probability is computed of the tree structure being an object learned and represented by the local bi-gram model or being a background (box 2030). The output are results of the object recognition in the query image (box 2040).

The details of the object recognition module now will be described in further detail in two steps. The first step is finding a tree of neighboring matching primitives (singlets, doublets, or triplets) that have a high probability given the local bi-gram object models. The second step is given a set of matching primitives, determining the object to which they belong. The following discussion will first describe how to compute the probability of an object given a tree, and then describe how to find tree using a greedy technique.

Finding Tree Structures of Matching Primitives

Figure 21:
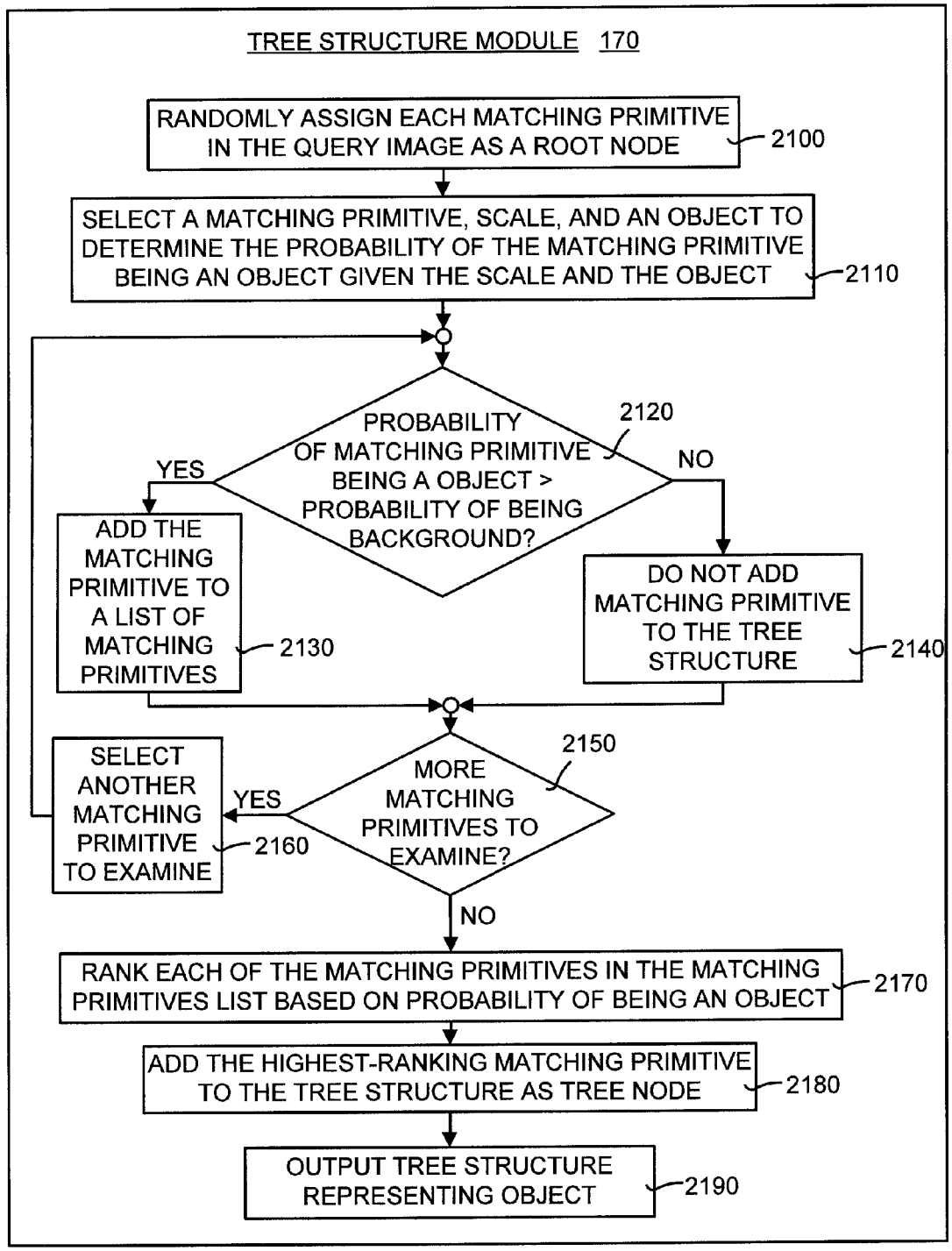
FIG. 21 is a flow diagram illustrating the detailed operation of the tree structure module shown in FIG. 1.

FIG. 21 is a flow diagram illustrating the detailed operation of the tree structure module 170 shown in FIG. 1. The process begins by randomly assigning each matching primitive in the query image as a root node (box 2100). The module 170 then selects a matching primitive, scale, and an object to determine the probability of the matching primitive being the object given the scale and the object (box 2110).

A determination then is made as to whether the probability of matching primitive being an object is greater than the probability of the object being a background (box 2120). If the probability is greater that the matching primitive is an object, then the matching primitive is added to a list of matching primitives (box 2130). Otherwise, if the probability is greater that the matching primitive is the background, then the matching primitive is not added to the tree structure (box 2140).

Another determination then is made as to whether there are more matching primitives to examine (box 2150). If so, then another matching primitive is selected for examination, as outlined above (box 2160). If there are no more matching primitives to examine, then each of the matching primitives is ranked in the matching primitives list based on a matching primitive's probability of being an object (box 2170). The highest-ranking matching primitive in the list then is added to the tree structure as a tree node (box 2180). The output of the process is a tree structure that represents an object (box 2190).

For clarity, in this discussion assumes that the matching primitive is a doublet. However, the same techniques also apply to singlets and triplets. First, a tree is constructed using a greedy algorithm. Initially, the initial probability for each matching primitive present in the test image is computed. The initial probabilities are computed by marginalizing over all possible objects O in the database using the equation:

$$p(d_i|I) = \sum_l p(d_i|O_l)p(O_l|I). \qquad (5)$$

The doublet with the highest likelihood is used as the root node in the tree. After the tree has grown to its full size, the next most likely doublet is found that was not used in a previous tree. This process is repeated until there are no remaining doublets.

After the root node is found, the tree is iteratively expanded, picking the most likely doublet to add to the tree at each time step. Given the current tree $G_t$, the most likely doublet $d_j$ is computed given the current likelihood of the objects O. This is computed by marginalizing over all objects using the equation, $$p(d_j|G_t) = \sum_l p(d_j|P(d_j), O_l)p(O_l|G_t). \qquad (6)$$

The new tree $G_{t+1}$ is created by adding the doublet $d_j$ to the tree $G_t$ that maximizes equation (6). Once a new doublet has been added to a tree, the likelihood of the objects within O can be updated using equations (7) and (8), given below.

Once the likelihoods of the objects are updated, the likelihoods of all possible neighboring doublets to the tree also are updated. New doublets then are iteratively added to the tree until no neighboring doublets in the image have a higher likelihood of belonging to an object than to the background. Since the number of possible doublets can be quite large, empirically computing the background probability is infeasible. In practice, setting the background probability to a constant $\epsilon$ provides reasonable results.

If the final probability of a tree belonging to an object is greater than it belonging to the background, an object is said to be found. Since the prior probability of the background typically is much higher than that of other objects, a tree must grow to a moderate size before an object's probability is higher than the background.

Probability of an Object Given a Tree Structure

Figure 22:
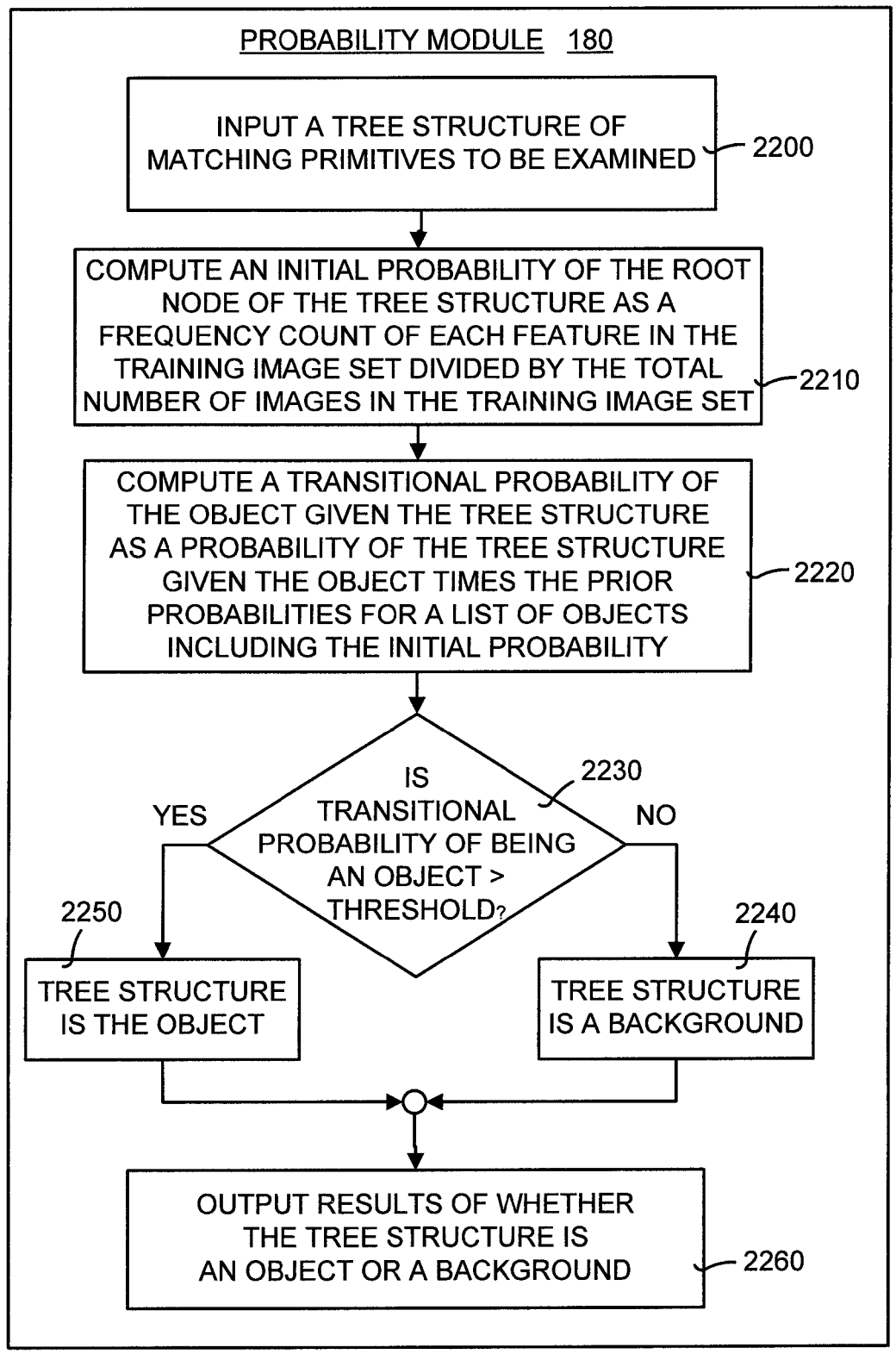
FIG. 22 is a flow diagram illustrating the detailed operation of the probability module shown in FIG. 1.

FIG. 22 is a flow diagram illustrating the detailed operation of the probability module 180 shown in FIG. 1. The process begins by inputting a tree structure of matching primitives for examination (box 2200). Next, an initial probability of the root node of the tree structure is computed (box 2210). This initial probability is computed as a frequency count of each feature (singlet, doublet, or triplet) in the training image set divided by the total number of image in the training image set. A transitional probability of the object given the tree structure then is computed as a probability of the tree structure given the object times (or multiplied by) the prior probabilities for a list of objects (box 2220). The prior probabilities includes the initial probability and the probability of any preceding nodes in the tree structure. This is represented by equation (7) below. Moreover, in some embodiments one of the objects in the list of objects is the background.

A determination then is made as to whether the aggregate transitional probabilities of being the object are greater than an object threshold (box 2230). Initially, the probability of the tree structure being a background is high and the probability of the tree structure being the object is low. In this situation the object threshold is not exceeded and the tree structure is classified as a background (box 2240). As the size of the tree structure increase, the probability of the tree structure being a background decreases and the probability of the tree structure being the object increases. Eventually, the tree structure may reach a certain size such that its probability of being the object overcomes the object threshold. In this situation, the tree structure is classified as the object (box 2250). In some embodiments, the object threshold is equal to 0.2. However, in alternate embodiments the object threshold may be adjusted up or down. The object threshold can be adjusted to yield more false positives or more false negatives, whichever is desired. The process then outputs the results of whether the tree structure is a background or the object (box 2260).

Previously how to find a tree structure with matching primitives belonging to a single object was described. In this section, finding the probability that the tree structure is an object is described. Once again, for clarity it is assumed that the matching primitive is a doublet. However, the same techniques also apply to singlets and triplets.

More specifically, assume that there is a tree G of matching primitives. For clarity, assume that the matching primitive is a doublet. However, the same techniques also apply to singlets and triplets. Using Bayes Theorem it is found that, $$p(O_l|G) \propto p(G|O_l)p(O_l) \quad (7).$$

The prior probabilities $p(O_l)$ for the objects $O_l$ can be assumed to be uniform, unless addition information is known. For instance, if it is known the image was taken indoors, objects that are more likely to be found indoors can be given higher prior probabilities. Besides the objects that have been modeled, there is also a prior background probability. This background probability p(BG) typically has a value much higher than the objects' prior probabilities, since for most images the majority of doublets and triplets will lie on unknown objects.

In the tree, each doublet $d_i$ has a parent $P(d_i)$, with the root node of the tree having no parent being $P(d_r)=0$. Given its tree structure, the likelihood of G can be computed as a product of conditional probabilities, $$p(G|O_l) = \prod_i p(d_i|P(d_i), O_l). \quad (8)$$

The probability of the root node of the tree is referred to as the initial probability, and all remaining probabilities as transition probabilities within the tree.

Since the tree provides an implicit ordering of the primitives, the above model can be viewed as a bi-gram model applied to a tree structure. In other words, each primitive depends on its preceding primitive, or its parent in the tree. The transition probabilities can be computed using equation (4) using the local bi-gram object model. The initial probability $p(d_i|O_l)$ of the root node is the normalized frequency count of doublets assigned to the same word as $d_i$ within the object training set.

Implementation Details

In this section, the implementation details of the local bi-gram model object recognition system and method are discussed. For interest point detectors, some embodiments use either SIFT detection or the Harris corner detection across multiple scales. However, it was found that a feature's orientation computed using these methods often were unstable for object category recognition. Thus, in these embodiments the orientation was computed by finding the angle at which the feature's descriptor best matched that of a descriptor cluster mean. For embodiments using the K-means clustering of descriptors, the assignment to clusters also was found by matching over all orientations. For efficiency, some embodiments used only 16 orientations.

The function $\Delta(f_i,c)$ in equation (4) is computed by finding the three closest cluster centers $c_i(1)$, $c_i(2)$, and $c_i(3)$ to $f_i$'s descriptor over all orientations. If $d(f_i,c)$ is the distance between $f_i$'s descriptor and $c^{th}$ cluster mean, then:

$$\Delta(f_i, c) = 1 - \max\left(0, \frac{d(f_i, c) - d(f_i, c_i(1))}{d(f_i, c_i(3)) - d(f_i, c_i(1))}\right). \quad (9)$$

Thus, the closest cluster $c_i(1)$ has a value of 1 while the second cluster $c_i(2)$ varies between 0 and 1. For all other values of c, $\Delta(f_i,c)=0$. Using this soft assignment technique, the occurrence of misclassifying feature descriptors to cluster indices is reduced.

In some embodiments, it has been determined that the probability of a transition feature belonging to the background, used to decide when a tree should stop growing, should be set to $p(f_i(j)|BG)=0.05$ for singlets and $p(f_i(j)|BG)=0.2$ for doublets and triplets. The value is lower for singlets since they occur in general with higher frequency.

Semi-Supervised and Unsupervised Learning

The local bi-gram model object recognition system and method is capable off performing automatic learning. One type of automatic learning is semi-supervised learning. This is taking a collection of images containing an object (such as a face) and learning a model just from them. It is semi-supervised because the system is not actually given the location of the object in the images.

On the other hand, unsupervised learning takes the same collection of images and includes an equal or greater number of random images. The system then is expected to learn a model. If, for example, the objects are faces, the question is whether the system learns a face model, or whether the system is distracted by all the background images. When using the local bi-gram model object recognition system and method the singlets/doublets/triplets are randomly dispersed and do not co-occur so that the correct model can be learned unsupervised. Unsupervised learning has the advantage that it requires the least amount of human interaction, as compared to supervised learning and manual learning.

Automatic Object Recognition

The local bi-gram model object recognition system and method also is capable of automatically recognizing objects. The system and method have shown the ability to build coherent trees from unstructured data. Without supervision, groups corresponding to images were found by the system and method. Moreover, every occurrence of the objects was found, even though some of the objects deformed (face and T-shirt) and pairs of specific instances of the object may not share features (rotating globe).

IV. Exemplary Operating Environment

The local bi-gram model object recognition system and method is designed to operate in a computing environment. The following discussion is intended to provide a brief, general description of a suitable computing environment in which the local bi-gram model object recognition system and method may be implemented.

Figure 23:
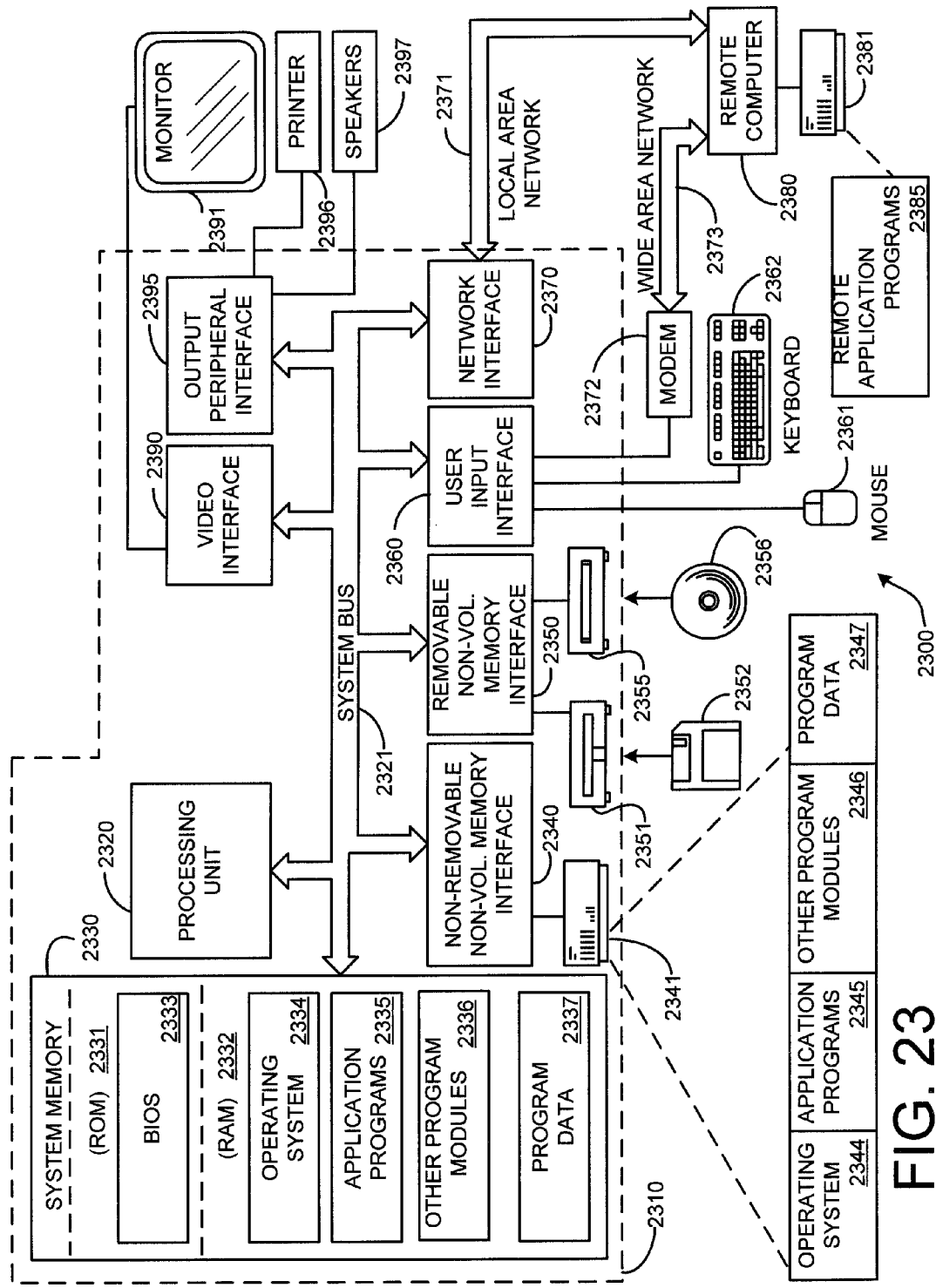
FIG. 23 illustrates an example of a suitable computing system environment in which the local bi-gram model object recognition system and method may be implemented.

FIG. 23 illustrates an example of a suitable computing system environment in which the local bi-gram model object recognition system and method may be implemented. The computing system environment 2300 is only one example of a suitable computing environment and is not intended to suggest any limitation as to the scope of use or functionality of the invention. Neither should the computing environment 2300 be interpreted as having any dependency or requirement relating to any one or combination of components illustrated in the exemplary operating environment.

The local bi-gram model object recognition system and method is operational with numerous other general purpose or special purpose computing system environments or configurations. Examples of well known computing systems, environments, and/or configurations that may be suitable for use with the local bi-gram model object recognition system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The local bi-gram model object recognition system and method may be described in the general context of computer-executable instructions, such as program modules, being executed by a computer. Generally, program modules include routines, programs, objects, components, data structures, etc., that perform particular tasks or implement particular abstract data types. The local bi-gram model object recognition system and method may also be practiced in distributed computing environments where tasks are performed by remote processing devices that are linked through a communications network. In a distributed computing environment, program modules may be located in both local and remote computer storage media including memory storage devices. With reference to FIG. 23, an exemplary system for the local bi-gram model object recognition system and method includes a general-purpose computing device in the form of a computer 2310 (the computing device 110 shown in FIG. 1 is an example of the computer 2310).

Components of the computer 2310 may include, but are not limited to, a processing unit 2320 (such as a central processing unit, CPU), a system memory 2330, and a system bus 2321 that couples various system components including the system memory to the processing unit 2320. The system bus 2321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 2310 typically includes a variety of computer readable media. Computer readable media can be any available media that can be accessed by the computer 2310 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 2310. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 2330 includes computer storage media in the form of volatile and/or nonvolatile memory such as read only memory (ROM) 2331 and random access memory (RAM) 2332. A basic input/output system 2333 (BIOS), containing the basic routines that help to transfer information between elements within the computer 2310, such as during start-up, is typically stored in ROM 2331. RAM 2332 typically contains data and/or program modules that are immediately accessible to and/or presently being operated on by processing unit 2320. By way of example, and not limitation, FIG. 23 illustrates operating system 2334, application programs 2335, other program modules 2336, and program data 2337.

The computer 2310 may also include other removable/non-removable, volatile/nonvolatile computer storage media. By way of example only, FIG. 23 illustrates a hard disk drive 2341 that reads from or writes to non-removable, nonvolatile magnetic media, a magnetic disk drive 2351 that reads from or writes to a removable, nonvolatile magnetic disk 2352, and an optical disk drive 2355 that reads from or writes to a removable, nonvolatile optical disk 2356 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2341 is typically connected to the system bus 2321 through a non-removable memory interface such as interface 2340, and magnetic disk drive 2351 and optical disk drive 2355 are typically connected to the system bus 2321 by a removable memory interface, such as interface 2350.

The drives and their associated computer storage media discussed above and illustrated in FIG. 23, provide storage of computer readable instructions, data structures, program modules and other data for the computer 2310. In FIG. 23, for example, hard disk drive 2341 is illustrated as storing operating system 2344, application programs 2345, other program modules 2346, and program data 2347. Note that these components can either be the same as or different from operating system 2334, application programs 2335, other program modules 2336, and program data 2337. Operating system 2344, application programs 2345, other program modules 2346, and program data 2347 are given different numbers here to illustrate that, at a minimum, they are different copies. A user may enter commands and information into the computer 2310 through input devices such as a keyboard 2362 and pointing device 2361, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 2320 through a user input interface 2360 that is coupled to the system bus 2321, but may be connected by other interface and bus structures, such as, for example, a parallel port, game port or a universal serial bus (USB). A monitor 2391 or other type of display device is also connected to the system bus 2321 via an interface, such as a video interface 2390. In addition to the monitor, computers may also include other peripheral output devices such as speakers 2397 and printer 2396, which may be connected through an output peripheral interface 2395.

The computer 2310 may operate in a networked environment using logical connections to one or more remote computers, such as a remote computer 2380. The remote computer 2380 may be a personal computer, a server, a router, a network PC, a peer device or other common network node, and typically includes many or all of the elements described above relative to the computer 2310, although only a memory storage device 2381 has been illustrated in FIG. 23. The logical connections depicted in FIG. 23 include a local area network (LAN) 2371 and a wide area network (WAN) 2373, but may also include other networks. Such networking environments are commonplace in offices, enterprise-wide computer networks, intranets and the Internet.

When used in a LAN networking environment, the computer 2310 is connected to the LAN 2371 through a network interface or adapter 2370. When used in a WAN networking environment, the computer 2310 typically includes a modem 2372 or other means for establishing communications over the WAN 2373, such as the Internet. The modem 2372, which may be internal or external, may be connected to the system bus 2321 via the user input interface 2360, or other appropriate mechanism. In a networked environment, program modules depicted relative to the computer 2310, or portions thereof, may be stored in the remote memory storage device. By way of example, and not limitation, FIG. 23 illustrates remote application programs 2385 as residing on memory device 2381. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A computer-implemented method for recognizing an object in a query image, comprising:
    constructing a local bi-gram model implemented on the computer that has learned objects in a training set of images and represents each of the objects as a local relationship between neighboring matching primitives that are dependent on a single parent node in a tree structure; and
    recognizing the object in the query image using tree structure and the local bi-gram model.

2. The computer-implemented method of claim 1, wherein recognizing the object in the query image further comprises find tree structures in the query image that obey the local bi-gram model.

3. The computer-implemented method of claim 2, further comprising computing a probability of each tree structure being one of the learned objects in the local bi-gram model.

4. A computer-readable storage medium having computer-executable instructions stored thereon for constructing a local bi-gram model, comprising:
    obtaining a training set of images;
    performing interest point detection on each image in the training set of images to obtain a plurality of interest points; and
    clustering matching primitives obtained from the plurality of interest points to obtain the local bi-gram model.

5. The computer-readable storage medium of claim 4, further comprising:
    generating features from the plurality of interest points; and
    generating matching primitives from the features.

6. The computer-readable storage medium of claim 5, further comprising finding neighboring matching primitives using transition features.

7. The computer-readable storage medium of claim 6, further comprising transforming the neighboring matching primitives into a canonical frame.

8. The computer-readable storage medium of claim 7, further comprising projecting other matching primitives into the canonical frame.

9. The computer-readable storage medium of claim 8, further comprising clustering the neighboring matching primitives and the other matching primitives using a clustering technique to obtain clusters of matching primitives.

10. The computer-readable storage medium of claim 9, further comprising:
    removing outlier matching primitives from the clusters of matching primitives to obtain updated clusters; and
    outputting the local bi-gram model containing a representation of local relationships between remaining matching primitives in the updated clusters.

11. A computer-implemented process for recognizing objects in a query image using a local bi-gram model, comprising:
    using the computer to find a tree structure of matching primitives in the query image that obeys the local bi-gram model such that spatial relationships between the matching primitives are modeled using local relationships represented by transitional probabilities between neighboring matching primitives;
    computing a probability of the tree structure being an object learned by the local bi-gram model; and
    outputting results of recognizing the objects based on the probability computation.

12. The computer-implemented process of claim 11, wherein finding a tree structure further comprises:
    randomly assigning each matching primitive in the query image as a tree node of the tree structure; and
    selecting a matching primitive, a scale, and an object to determine the probability of the matching primitive being an object given the scale and the object.

13. The computer-implemented process of claim 12, further comprising:
    determining whether a probability of the matching primitive being the object is greater than a probability of the matching primitive being a background; and
    if not, then not adding the matching primitive to the tree structure.

14. The computer-implemented process of claim 13, further comprising:
    if so, then adding the matching primitive to a list of matching primitives; and
    selecting another matching primitive to examine and processing as above until there are no more matching primitives to examine.

15. The computer-implemented process of claim 14, further comprising ranking each of the matching primitives in the list of matching primitives based on the probability of being an object.

16. The computer-implemented process of claim 15, further comprising:
adding a highest-ranking matching primitive to the tree structure as a tree node; and
outputting a tree structure representing the object.

17. The computer-implemented process of claim 11, wherein computing a probability of the tree structure further comprises computing an initial probability of a root node of the tree structure as a frequency count of each feature in a training image set divided by a total number of images in the training image set.

18. The computer-implemented process of claim 17, further comprising computing a transitional probability of the object given the tree structure as a probability of the tree structure given the object multiplied by prior probabilities for a list of objects that includes the initial probability.

19. The computer-implemented process of claim 18, wherein the list of objects includes a background.

20. The computer-implemented process of claim 19, further comprising:
determining whether the transitional probability is greater than an object threshold;
if so, then classifying the tree structure as the object; and
if not, then classifying the tree structure as a background.

* * * * *